April 21, 1931.  J. N. BURKLE  1,801,952
LOCK FOR DEMOUNTABLE RIMS
Filed March 3, 1928
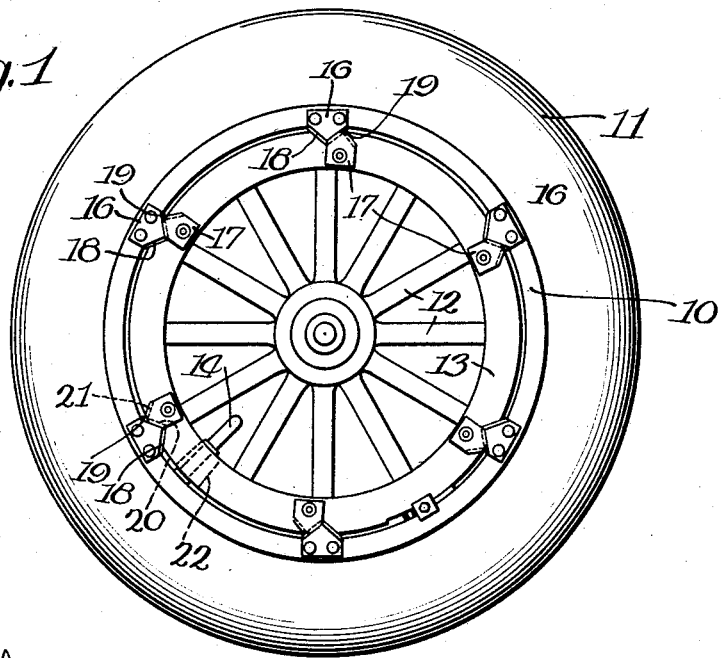
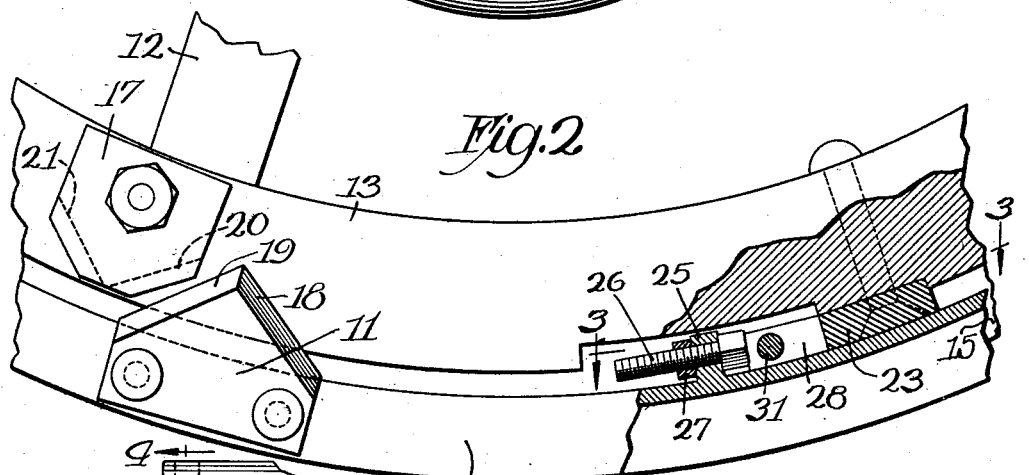
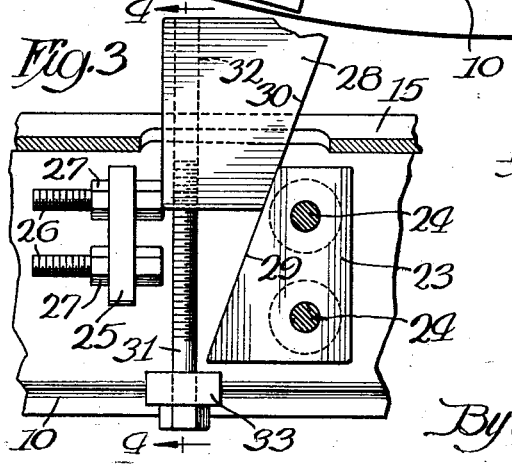
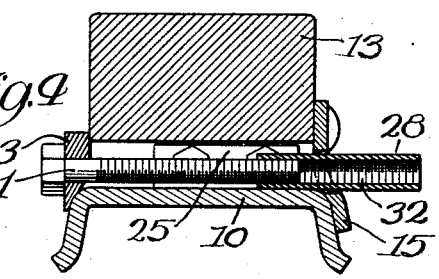
Inventor
Joseph N. Burkle
By Fisher, Towle, Claff + Soans Attys.

Patented Apr. 21, 1931

1,801,952

UNITED STATES PATENT OFFICE

JOSEPH N. BURKLE, OF EAGLE RIVER, WISCONSIN

LOCK FOR DEMOUNTABLE RIMS

Application filed March 3, 1928. Serial No. 258,730.

This invention relates to locks for demountable rims, and more particularly to means for locking demountable rims on automobile wheels.

The principal object of the invention is to provide a simplified, easily manipulated means for locking a demountable rim on a wheel. Another object of the invention is to provide a means which will be applicable to a standard form of demountable rim and wheel without necessitating substantial changes in the construction of the wheel or rim. It is also an object of the present invention to provide a rim lock which will be simultaneously effective to force the wheel inwardly over the rim into engagement with a stop flange or the like on the inner face of the wheel, and to prevent relative rotation between the wheel and rim when the same are locked together. In general, the object of this invention is to provide an improved lock for demountable rims, which is simple in operation, easy to manipulate, and which locking means may be engaged or disengaged in a minimum of time. Other objects of the invention will be understood by reference to the following specification and accompanying drawing in which I have illustrated an automobile wheel and demountable rim secured together by locking means embodying a selected form of my invention.

In the drawings:

Fig. 1 is a side elevation of an automobile wheel including a demountable rim and tire.

Fig. 2 is an enlarged view in elevation of a portion of Fig. 1, the tire being omitted and a portion being broken away to more clearly show certain features of my invention.

Fig. 3 is a section on the line 3—3 of Fig. 2, and

Fig. 4 is a section on the line 4—4 of Fig. 3.

Referring now to the drawings, I have indicated a demountable rim 10, carrying a tire 11 mounted on an automobile wheel 12. The wheel 12 in the present embodiment is of the type often referred to as an artillery wheel and includes a felly 13. The tire 11 is secured to the rim 10 in any conventional manner and is served by a valve 14 which extends from the tire, through the rim and through a suitable aperture in the felly 13 of the wheel. My invention is not limited to use on artillery type wheels, and hence, it should be understood that by the term "felly", I contemplate the peripheral part of any type of wheel which is adapted to receive so called demountable rims.

A stop flange 15 is secured to the inner face of the felly 13 of the rim, projecting outwardly and extending around the wheel in accordance with usual practice. The rim 10 fits loosely over the felly 13 and when locked on the wheel abuts against the stop flange 15, which serves to prevent inward displacement or removal of the rim from the wheel.

For locking the rim on the wheel and against the stop flange 15, I provide a plurality of spaced lugs 16 secured in any suitable manner to the outside face of the rim 10 and a plurality of lugs 17 secured in any suitable manner to the outside face of the wheel felly 13. The lugs 16 have oppositely facing inclined and beveled edge portions 18 and 19, and the lugs 17 are also provided with oppositely facing inclined and beveled edge portions 20 and 21 which are similar to the inclined and beveled faces 18 and 19 of the lugs 16.

By an inspection of Fig. 2 it will be understood that when the rim is to be mounted on the wheel, the rim is slipped over the wheel in the usual manner, the lugs 16 of the rim being positioned closely adjacent but spaced sidewise from the lugs 17 carried by the wheel felly. The rim is then rotated relative to the wheel so that the inclined and bevelled faces 19 and 20 of the lugs 16 and 17 respectively are brought into cooperative engagement. It will be apparent that the bevel of the cooperating faces 19 and 20 serves in the manner of cam mechanism, to force the rim inwardly over the wheel felly, i. e., towards the stop flange 15, when the rim is rotated relative to the wheel. It will also be noted that the inclination of said cooperating faces urges or tends to cause the adjacent rim portions to move radially outwardly from the wheel felly, whereby the rim is effectively centered on the wheel, that is to say, the rim will be substantially equally spaced radially from the wheel felly around the entire periphery of the latter. By providing the lugs 16 and 17 with duplex inclined faces as above described, I avoid the necessity of providing right and left hand lugs and also permit any rim to be mounted on any wheel of the vehicle which is equipped with my form of rim lock. For permitting relative rotation between the wheel and rim as above described, I provide an elongated aperture 22 in the felly of the wheel for receiving the valve 14. It will be apparent that when the rim is placed on the wheel, the valve stem 14 will be passed through the aperture 22 adjacent the end remote from the normal position of the valve when the rim is locked on the wheel.

Any suitable means may be provided for effectively locking the rim against rotation relative to the wheel when the lugs 16 and 17 are in cooperative or locking engagement.

The rim may be caused to rotate relative to the wheel, from a position such as shown in Fig. 2, to locked position, by striking the edges of the lugs 18 with a hammer. Suitable means is, of course, provided for holding the rim in such locked position.

I prefer however, to provide a locking means which is incidentally effective to rotate the rim relative to the wheel so as to effect cooperating engagement between the lugs 16 and 17. This locking means according to the present invention, consists of a stop member 23 secured to the felly of the wheel by suitable means such as rivets 24, and a lug 25 secured to the rim 10 and provided with tapered apertures through which bolts 26 are screwed, a lock nut 27 being provided for locking each bolt 26 in the desired position of adjustment in the lug 25. A loose or independent wedge member 28 is provided and adapted to be inserted between the head of the bolt 26 and the adjacent edge 29 of the member 23, which edge is disposed at an angle, as clearly shown in Fig. 3. The wedge 28 is also provided with an angularly disposed edge 30 which engages the inclined edge 29 so that when the wedge member is forced inwardly between the heads of the bolts 26 and stop member 23, the rim and wheel are forced to rotate relative to each other.

For effecting inward movement of the wedge member 28 and for retaining the member in the desired position of adjustment, I provide a bolt 31 threadedly engaging a threaded aperture 32 in the wedge member and passing through a washer member 33, which is disposed against the outside face of the wheel felly 13 and adjacent portion of the rim 10. It will be apparent that when the bolt 31 is screwed into the wedge 28, the wedge will be drawn outwardly between the bolt 26 and member 23 so that the wheel and rim will be caused to rotate relative to each other.

The angle of the faces 29 and 30 of the members 23 and 28 is preferably such that the relative rotation imparted to the wheel will be sufficient to effect the necessary cooperating engagement between the lugs 16 and 17 when the rim is initially placed on the wheel in a position substantially as shown in Fig. 2, where the lugs 16 and 17 are spaced a distance apart sufficient to permit removal from or placement of the rim on the wheel without interference between the lugs 16 and 17. I may of course, substitute a fixed stop or lug on the rim of the wheel for the adjustable stop arrangement 25, 26 and 27, but I have found it desirable in some cases to provide the adjustable arrangement described. In some instances I provide a double wedge, that is, one having oppositely disposed inclined edges. With such a wedge, the angularity of each of the edges may be less than that of the inclined edge of a single wedge such as shown.

I am aware that changes may be made in the form, construction and arrangement of parts without departing from the spirit of the invention, for which reason the scope of the same should be determined by reference to the following claims which should be construed as broadly as possible consistent with the state of the art.

I claim as my invention:

1. In combination, a wheel, a rim removably mounted on the felly of said wheel, and means for locking said rim on said wheel, said locking means comprising a plurality of lugs attached to the outer side wall of said felly at circumferentially spaced locations, a plurality of lugs attached to the outer side wall of said rim at corresponding circumferentially spaced locations and overlapping the outer side wall of said felly, said wheel and rim lugs being formed with cooperating longitudinally inclined and transversely beveled edges adapted to engage each other under a turning movement of said rim on said felly to effect an interlock between said rim and felly preventing both outward and inward sidewise displacement of said rim from said felly, the cooperating bevels of said edges serving to urge said rim inwardly of the felly as the rim is turned, and the cooperating inclines of said edges serving to center the rim on the wheel, and means for locking the rim in adjusted position.

2. In combination, a wheel, a rim removably mounted on the felly of said wheel, and means for locking said rim on said wheel, said locking means comprising a plurality of flat lugs attached to the outer side wall of said felly at circumferentially spaced locations, a plurality of lugs attached to the outer side wall of said rim at corresponding circumferentially spaced locations and overlapping the outer side wall of said felly, said wheel and rim lugs being formed with cooperating edges that are correspondingly inclined to radii of the wheel and are transversely beveled, said edges being adapted to engage each other under a turning movement of said rim on said felly to effect an interlock between said rim and felly preventing both outward and inward sidewise displacement of said rim from said felly, the cooperating bevels of said edges serving to cam said rim inwardly of the felly as the rim is turned, and the cooperating inclines of said edges operating to force the rim radially outwardly of the felly, and means for locking the rim in adjusted position.

JOSEPH N. BURKLE.